Figure 1:
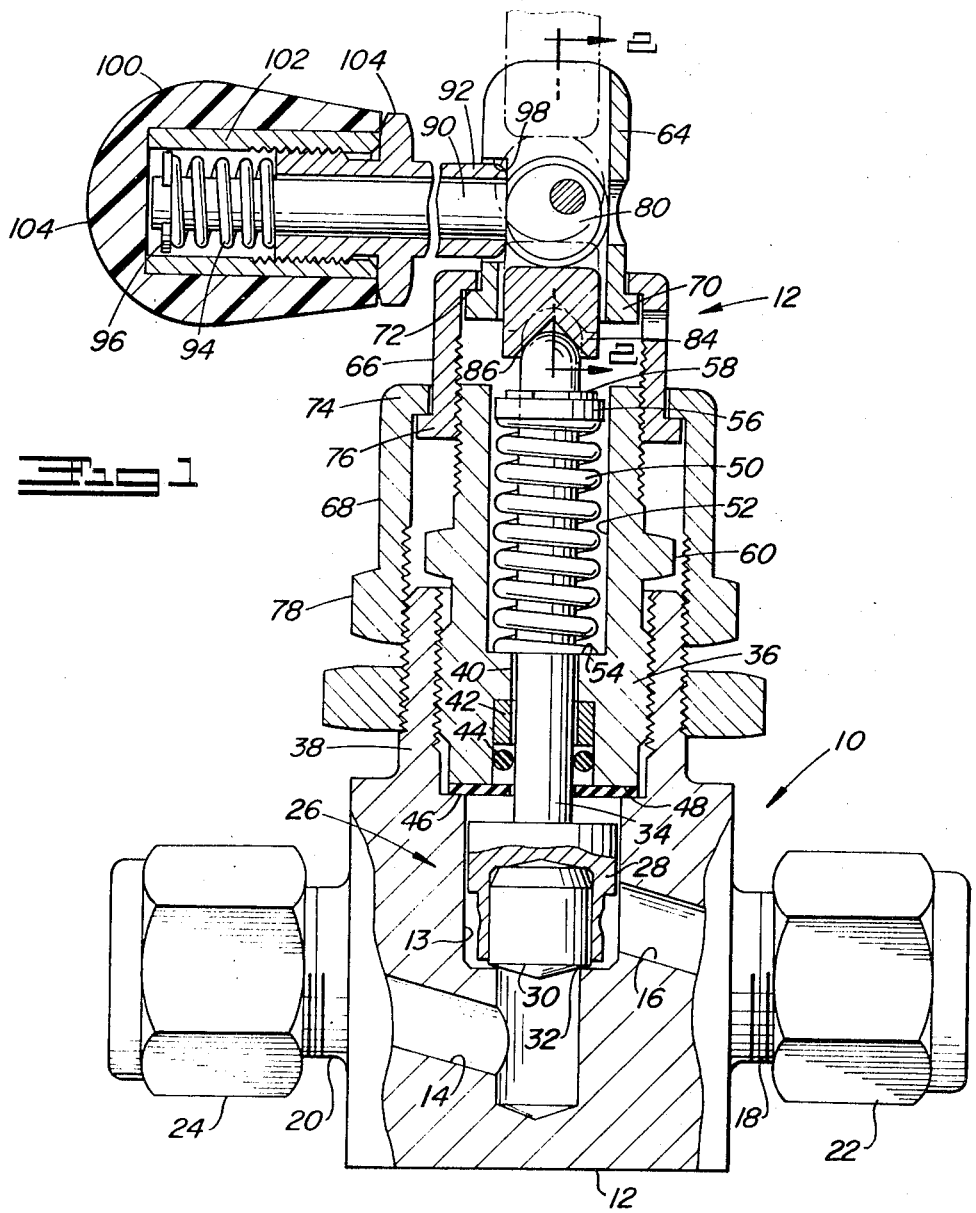

United States Patent
Shufflebarger et al.

[15] 3,656,709
[45] Apr. 18, 1972

[54] VALVE HAVING IMPROVED CAM-TYPE ACTUATOR

[72] Inventors: Earl D. Shufflebarger, Mentor; Oliver L. Danko, North Olmsted; Richard J. Medvick, Cleveland, all of Ohio

[73] Assignee: Nupro Company

[22] Filed: July 8, 1970

[21] Appl. No.: 53,065

[52] U.S. Cl. .................................................251/95, 251/263
[51] Int. Cl. ................................................................F16k 35/02
[58] Field of Search......................251/95, 96, 97, 98, 99, 263

[56] References Cited

UNITED STATES PATENTS

| | | | |
|---|---|---|---|
| 1,454,433 | 5/1923 | Franklin | 251/97 |
| 1,569,180 | 1/1926 | Hagberg | 251/97 |
| 2,646,248 | 7/1953 | Cornelius | 251/263 |
| 2,858,146 | 10/1958 | Bleyle | 251/96 |
| 3,015,420 | 1/1962 | Chudnow | 251/263 X |
| 3,279,748 | 10/1966 | Coulter | 251/263 |

FOREIGN PATENTS OR APPLICATIONS 1,212,848  10/1959  France...................................251/263

Primary Examiner—Henry T. Klinksiek
Attorney—Fay, Sharpe and Mulholland

[57] ABSTRACT

A valve of the type including a body having an internal valve chamber and a valve element mounted therein for reciprocatory movement between at least two positions for controlling flow through the chamber. An operating stem having a free end extending outwardly of the chamber is arranged for moving the valve element. The stem is moved by operating means including a cap means connected to the body and extending over the free end with a cam member mounted in the cap means for rotation about an axis perpendicular to the axis of the stem. An operating shaft extends from the cam member to a position outwardly of the cap means and an operating handle is associated with the shaft for moving it between at least two positions. Additionally, latching means are associated with the handle and the cap means for locking the cam in at least one position.

8 Claims, 2 Drawing Figures

INVENTORS
OLIVER L. DANKO
BY RICHARD J. MEDVICK
EARL D. SHUFFLEBARGER

Fay, Sharpe & Mulholland
ATTORNEYS

VALVE HAVING IMPROVED CAM-TYPE ACTUATOR

The present invention is directed toward the valve art and, more particularly, to a valve including an improved cam-type operator.

The invention will be described with reference to its embodiment in a specific shut-off valve; however, it will be appreciated, the invention is capable of broader application and could be embodied in many different structural arrangements.

Many valve applications require valve which can be opened and closed rapidly to provide quick response operation. In the past, ball valves and valves having various types of toggle operators have been the primary valves used for this purpose. Although generally, these valves have been satisfactory, they do have certain disadvantages. For example, often the valves can be accidentally opened or closed by bumping the operating handle. Further, the operating stems of these valves are often exposed or connected to the handle in such a way that an inadvertent impact with the stem or handle can damage internal parts of the valve. Also, with some of the prior valves, problems are encountered in insuring that the valve element is maintained in the full-off position.

The present invention overcomes the above-discussed problems and provides a valve having a cam-type operator which allows the valve to be moved from full-off to full-on with 90° or less movement of the operating handle. Valves formed in accordance with the invention, can be arranged so that the operating stem is completely enclosed and therefore protected against damage by accidental impacts on the handle or cap. Also, valves formed according to the invention can be locked in the closed position to prevent accidental opening.

In accordance with the invention, the valve preferably comprises the usual body including an internal valve chamber having a reciprocally mounted valve element positioned therein for movement between at least two positions for controlling flow through the body. An operating stem extends from the valve element to a position wherein it has a free end outwardly of the valve chamber. The operating means for moving the valve element between its two positions includes a biasing means for continually maintaining the valve element under a predetermined bias toward one of the positions. The mechanism for moving the valve toward the other position includes a cap member connected to the valve body and enclosing the free end of the stem. Preferably, but not necessarily, the cap member is arranged so that it is freely rotatable relative to the valve body about an axis generally parallel to or coextensive with the axis of the operating stem. Positioned within the cap is a cam member which is mounted for rotation about an axis generally perpendicular to the axis of the stem. Rotation of the cam causes the movement of the stem and the valve element against the action of the biasing means and, preferably, the cam is drivingly connected with the stem through an intermediate thrust member which has some lateral freedom of movement relative to both the cam and the free end of the stem. The means for rotating the cam to shift the position of the valve element comprises a shaft member which extends from the cam outwardly of the cap. A latching member also is associated with the stem for latching the cam in a position to maintain the valve element in one of the two positions of movement. Preferably, the latching means includes a sleeve which surrounds the shaft and is biased toward the cap and the cap includes a sleeve receiving opening which cooperates with the sleeve to prevent movement of the shaft except upon withdrawal of the sleeve.

As is apparent, because of the arrangement of the cap and the latching means, the valve element cannot be inadvertently moved from the position in which it has been locked. Further, because of the arrangement of the cap relative to the stem and the body, an accidental bumping of the handle or the cap cannot cause internal damage to the valve since both the cap and the thrust member can shift without transmitting movement of lateral forces to the stem.

Accordingly, the primary object of the invention is the provision of a valve having an improved operating arrangement which prevents inadvertent movement of the operating handle.

Still another object is the provision of a valve of the general type described wherein the stem member is completely enclosed and cannot be subjected to lateral forces by accidental impacts with the handle or the cap.

A still further object is the provision of a valve of the type described wherein movement between a full-off and full-on position can be accomplished by approximately 90° or less movement of the operating handle.

Yet another object is the provision of a reciprocating-type valve wherein the operating stem is totally enclosed and has no rigid connections with the operating handle.

Figure 2:
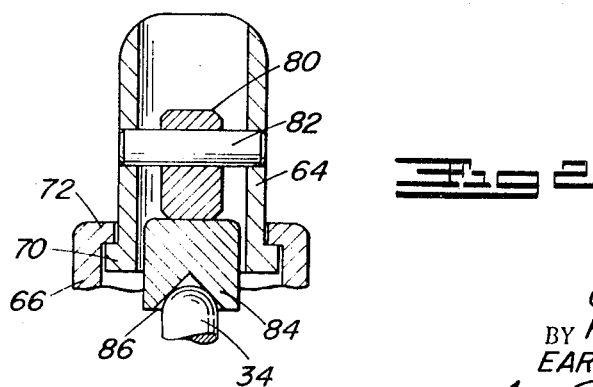

These and other objects and advantages will become apparent from the following description when read in conjunction with the accompanying drawings wherein;

FIG. 1 is a vertical cross-section through a preferred embodiment of the invention; and, FIG. 2 is a fragmentary cross-sectional view taken on line 2—2 of FIG. 1.

Referring more particularly to FIG. 1, it will be seen that the embodiment shown comprises a somewhat conventional valve body section 10 having an operating assembly 12 carried thereby.

Although the valve body section 10 could have many specific constructions, in the embodiment shown it comprises one body 12 formed by machining, casting, or the like and provided with a generally cylindrical internal valve chamber 13. Flow passages 14 and 16 connect the chamber 13 with inlet and outlet openings 18 and 20. The openings 18 and 20 are provided with means to permit the valve body to be connected with the flow lines being controlled. Any type of connection means, such as flanges, pipe threads and so on could be used; however, in the embodiment shown, the connections comprise swage-type fittings 22 and 24.

Flow through the valve chamber 13 is controlled by a valve element 26 which is mounted for reciprocation along the axis of the valve chamber 13. The valve element shown comprises a somewhat cylindrical metal body portion 28 provided with a valving insert member 30 which, depending upon the particular type of fluid being handled, can be either metal or nonmetal.

In the valve under consideration, the seat portion of the valve is formed by the internal edge or corner 32 which is at the junction between the bottom wall of the valve chamber 13 and the vertical section of the flow passage 14. Additionally, the valve element insert 30 is preferably relatively blunt so as to minimize the movement required between the full-off and full-on positions.

Extending vertically upward from the top of the valve element 26 is a generally cylindrical operating stem 34 which, in the embodiment shown, is formed integrally with the valve element body 28. The stem 34 is guided and sealed where it exits from the chamber by a packing gland nut member 36 which is threadedly received in the bonnet portion 38 of the body 12. It will be seen that the gland nut member 36 includes an internal bore 40 which is of a diameter to closely and slidably receive the stem 34. The lower end of the bore 40 is counterbored to a larger diameter and receives a guide bushing or spacer 42 which surrounds stem 34. The spacer 42 is preferably formed from Teflon or the like. Also received in the counterbore is an O-ring 44 that sealingly surrounds the stem 34 at a location contiguous to the gland or spacer 42.

The spacer 42 and the O-ring 44 are retained in the counterbore by a washer-gasket 46. Gasket 46 is disposed between the end 48 of the nut 36 and the shoulder between the valve chamber 13 and the internal bore of the bonnet 38. In addition to retaining the spacer 42 and the O-ring 44, the washer gasket 46 also provides a seal at the juncture between the valve chamber and the nut member 36.

The valve member is continually maintained under a bias tending to move it toward its open position. In the embodiment under consideration, this is accomplished by a coil spring 50 which surrounds the stem 34 within a counterbore 52 in the upper end of the bore 40. As can be seen, the spring is positioned between the shoulder 54 and a washer 56 connected to the upper free end of the stem by a snap ring 58.

To permit removal of the packing nut 36 and the stem and valve member from the body, the packing nut is preferably provided with tool flats 60 and its intermediate portion.

Or particular importance to the invention, is the arrangement of the operating assembly 12. Although the assembly 12 could take many forms within the scope of the invention, it is shown as including a generally cylindrical, hollow cap member 64 which is connected to the body 12 by an adjusting nut member 66 and a locking nut member 68. As shown, the cap 64 has an outwardly extending shoulder 70 formed on its lower end which is engaged by an inwardly extending shoulder 72 formed on the upper end of the adjusting nut 66. As can be appreciated, this allows the cap 64 to be freely rotatable relative to the adjusting nut 66 and the body 12 but prevents it from having vertical movement because of the cooperating shoulders or flanges 70, 72.

The adjusting nut 66 is threadedly received on the upper end of the packing gland 36 and allows the position of the cap relative to the body to be adjusted by merely rotating the adjusting nut. In the embodiment shown, the locking nut 68 is provided with an inwardly extending flange 74 which engages a corresponding outwardly extending flange 76 formed on the lower end of the adjusting nut 66. The locking nut is threadedly received on the bonnet portion 38 and, consequently, when the adjusting nut has been adjusted to the position desired, tightening of the locking nut will prevent undesired movement of the adjusting nut. To permit easy adjustment of the locking nut, it is preferably provided with wrench flats 78 about its lower end.

Carried within the cap member 64 and mounted for rotation about an axis which extends perpendicular to the longitudinal axis of the stem 34 is a generally circular cam member 80. As best shown in FIG. 2, the cam member 80 is carried by a pin 82 which extends through the side walls of the cap member 64. The cam 80 is connected in driving relationship with the upper free end of the shaft 34 by a thrust member 84. As illustrated, the upper free end of the shaft 34 is preferably rounded and received in a tapered opening 86 formed in the lower end of the thrust member 84. As can be appreciated, this arrangement permits vertical forces to be transmitted to the shaft from the cam but prevents the application of transverse forces such as may result by an accidental hitting or other impact with the cap member 64. Additionally, the tapered opening acts as a guide for the upper end of the stem.

The means for rotating the cam 80 comprise a shaft 90 which is welded, integrally connected or otherwise positively connected to the cam at the location shown. The cap 64 is vertically slotted a width slightly greater than the diameter of shaft 90 to permit rotation of the cam from the position shown by solid lines to the dotted line position wherein the valve element 26 is permitted to move under the influence of the spring 50 to an open position. Note that by controlling the contour of the cam member 80, the valve can be moved from a full-close to a full-open position with 90° or less movement of the shaft 90.

One particularly important feature of the invention is the arrangement whereby the valve can be latched in a closed position. The latching means in the embodiment under consideration takes the form of a sleeve member 92 which is slidably received on the shaft 90. The sleeve is maintained under a continuous bias toward cap 64 by a coil spring 94 which bears against the outer end of the sleeve 92 and a snap ring or washer 96 carried on the outer end of shaft 90.

The cap member 64 is provided with a recess or opening 98 adapted to receive the inner end of the sleeve 92. Thus, when the shaft is rotated to the solid line position, the sleeve 92 enters the opening 98 to prevent rotation of the sleeve except in conjunction with an outward movement of the sleeve.

The valve also includes an operating handle portion 100 which encloses the outer end of shaft 90 and the spring 94 to facilitate operation of the shaft 90 and the latching means. In the embodiment shown, the handle 100 includes an internally threaded sleeve portion 102 which is threaded on the outer end of the sleeve 92. An outwardly extending flange 104 is carried by the sleeve and limits the inward movement of the handle 100. Preferably, the sleeve 102 is enclosed by or formed as part of a contoured molded section 104.

As can be appreciated, the freely rotatable nature of the cap 64 allows the handle and operating stem 90 to be rotated a full 360° about the axis of the stem 34. Thus, any accidental side thrust on the handle cannot affect the internal members of the valve. Similarly, the cap member 64 also has some freedom of movement in directions lateral to the stem 34. This combination of freedom and the completely enclosed stem prevents transfer of forces to the stem.

The invention has been described in great detail sufficient to enable one of ordinary skill in the valve art to make and use the same. Obviously, modifications and alterations of the preferred embodiment will occur upon a reading and understanding of the specification and it is our intention to include all such modifications and alterations as part of our invention insofar as they come within the scope of the appended claims.

What is claimed is:

1. A valve comprising:

a body having an internal valve chamber and flow passages extending into said chamber;

a reciprocal valve element carried within said chamber and arranged for movement between a first position where it blocks flow through said chamber to a second position where it permits flow through said chamber;

an operating stem member connected to said valve element and having a free end extending outwardly of said chamber;

biasing means for maintaining said valve element continually biased toward said second position;

cap means connected to said body and enclosing said free end of said stem; and, operating means for moving said valve element from said second to said first position, said operating means including a cam member carried by said cap for rotation about an axis generally perpendicular to the axis of said stem, handle means for rotating said cam member, comprising a shaft connected to said cam member and extending outwardly of said cap means, and manually releasable latching means between said handle and said cap means for latching said handle in a position wherein said stem and valve element are in said first position, said latching means including a sleeve carried by said shaft and biased toward said cap.

2. The valve as defined in claim 1 wherein said cap means is freely rotatable relative to said body in a plane perpendicular to the axis of said stem.

3. The valve as defined in claim 1 including adjusting means between said cap means and said body for varying the position of said cap relative to said body.

4. The valve as defined in claim 1 including a thrust member positioned between said cam member and the free end of said stem.

5. A valve of the type including a body having a valve chamber with a reciprocable valve element positioned therein and an operating stem with a free end extending outwardly of said valve chamber for movement between at least two positions including an open position and a closed position, and means for biasing said element toward one of said positions; the improvement comprising:

cap means connected to said body and extending over the free end of said stem;

a cam member mounted in said cap means for rotation about an axis perpendicular to the axis of said stem;

an operating shaft extending from said cam outwardly of said cap means and including an operating handle for moving said shaft; and, a latch assembly operable by said handle and including a reciprocal member carried by said shaft and biased toward and engageable with said cap means for locking said cam member in at least one position.

6. The valve as defined in claim 5 wherein said cap means is freely rotatable relative to said body.

7. The valve as defined in claim 5 including adjusting means between said cap means and said body for varying the position of said cap relative to said body.

8. The valve as defined in claim 5 including a thrust member positioned between said cam member and the free end of said stem.

* * * * *